United States Patent Office 3,433,775
Patented Mar. 18, 1969

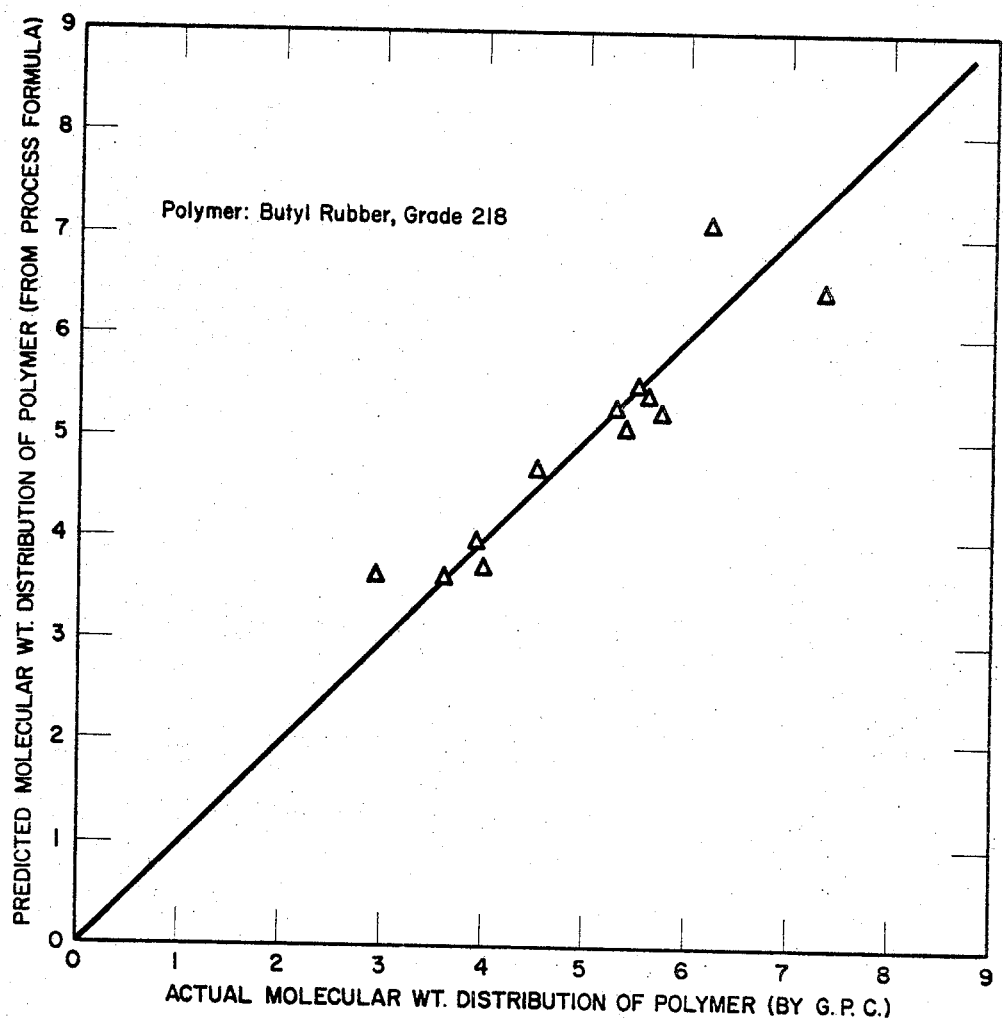

3,433,775
PROCESS OF MAKING BUTYL RUBBER WHEREBY A BROAD MOLECULAR WEIGHT DISTRIBUTION IS OBTAINED UNDER CONTROLLED CONDITIONS
Richard Louis Ray and Marnell A. Segura, Baton Rouge, La., and John L. Bryan, Jr., Summit, N.J., assignors to Esso Research and Engineering Company, a corporation of Delaware
Filed Jan. 12, 1966, Ser. No. 520,282
U.S. Cl. 260—85.3
Int. Cl. C08f *1/72, 15/04*
8 Claims

ABSTRACT OF THE DISCLOSURE

A process for preparing solid polymers from isoolefins and multiolefins having a desired molecular weight distribution which comprises operating the process according to the formula:

$\overline{M}_w/\overline{M}_n$=Molecular weight distribution=$0.925 + 0.057(A) + 0.263(B) - [(5 \times 10^{-5})(C)]$ This invention relates to an improved process for the production of olefinic homopolymers or copolymers. More particularly, this invention relates to a method for controlling a polymerization reaction so as to consistently obtain homopolymers or copolymers of any predetermined molecular weight distribution.

It is known that isoolefins may be homopolymerized or copolymerized with multiolefins in the presence of Friedel-Crafts catalysts thereby producing polymers having Staudinger molecular weights of 10,000 to 1,000,000 or more. These polymers may be prepared by methods well known in the prior art such as, for example: (a) the "slurry" process as disclosed in U.S. Patent 2,596,975 issued May 20, 1952 to J. H. Bannon and incorporated herein by reference; this process makes use of an inert diluent which is a nonsolvent for the final polymer; (b) the "solution" process as disclosed in U.S. Patent 2,844,-569 issued July 22, 1958, to A. D. Green et al. and incorporated herein by reference; this process makes use of an inert diluent which is a solvent for the final polymer; (c) the "solvent replacement" process as disclosed in U.S. Patent 2,988,527 issued June 13, 1961 to B. R. Tegge and incorporated herein by reference; this process initially utilizes a diluent which is a nonsolvent for the final polymer during the polymerization reaction and the nonsolvent is subsequently replaced by a diluent which will dissolve the final polymer.

Heretofore, numerous difficulties have been encountered in homopolymerizing isoolefins or copolymerizing isoolefins with multiolefins, particularly as regards the control of the polymerization reaction and the polymers thereby produced. In the past, these polymerization reactions (conducted batchwise or continuously) were carried out under conditions such that the molecular weight distributions of the polymer varied without reproducibility from a figure as low as 1.0 to as high as 4.0. In addition, difficulties were encountered in processing the reactor effluent (i.e. the steps of catalyst and diluent removal, recovery, drying, extrusion and milling of the polymer product) thus necessitating increased man power and horsepower costs during the processing steps.

Accordingly, it is an object of the present invention to provide a process whereby polymers, i.e. olefinic homopolymers or copolymers, of any desired molecular weight distribution may be consistently obtained. It is also an object of the present invention to provide a process for the preparation of polymers having a molecular distribution of greater than 4, preferably 5 to 7 or more, since these polymers unexpectedly possess outstanding physical properties.

The term "molecular weight distribution" of the polymer as employed herein is defined by the ratio $\overline{M}_w/\overline{M}_n$ wherein $\overline{M}_w$ is the weight average molecular weight and $\overline{M}_n$ is the number average molecular weight of the polymer. The molecular weight distribution of the polymer may be readily determined by the recently introduced technique of gel permeation chromatagraphy described in the Journal of Polymer Science, part A, vol. 2, pp. 835–843 (1964) and American Chemical Society Polymer Preprints, vol. 5, No. 2, pp. 706–727 (1964). The results obtained by gel permeation chromatography are preferably standardized against those obtained by the classical techniques of light scattering and/or osmometry to insure the absence of experimental error. A description of the method of determining molecular weight distribution of a polymer by light scattering and/or osmometry may be found in "Techniques of Polymer Characterization" by P. W. Allen, pp. 2–5 (Butterworth's Publications, Ltd., London, England, 1959).

The object of this invention will be apparent from the following description when read in conjunction with the accompanying drawings in which:

FIGURE 3 is a graphical illustration of the correlation between the actual molecular weight distribution of the polymer as determined by gel permeation chromatography and the predicted molecular weight distribution calculated from the process formula set forth below.

Figure 1:
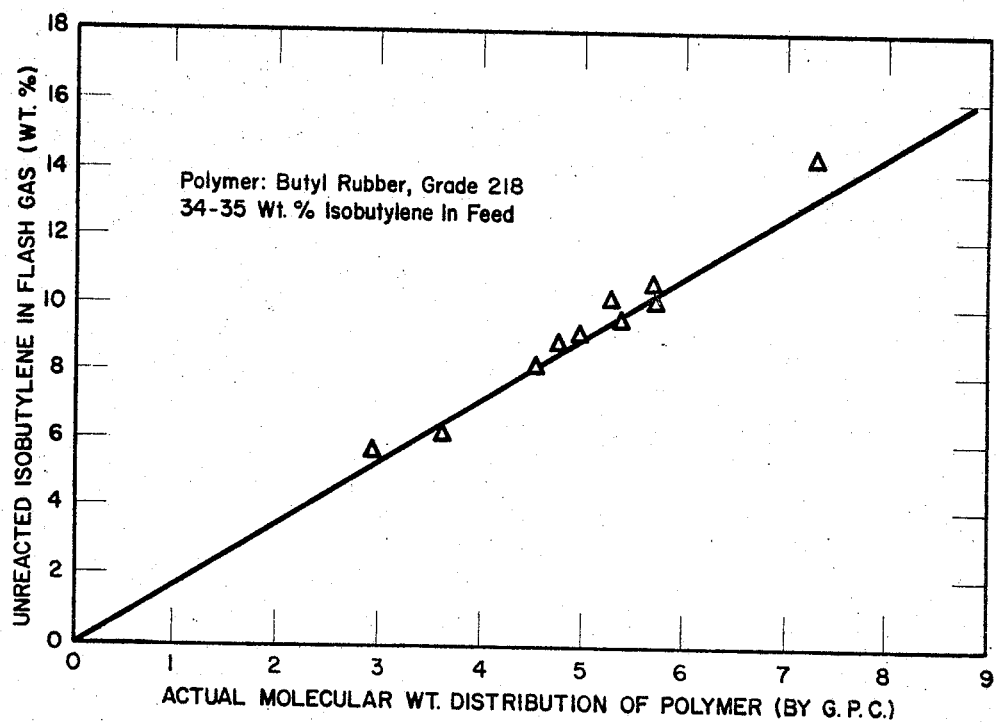
FIGURE 1 is a graphical illustration of the effect of the residual unreacted monomer concentration in the reactor effluent (at a concentration of 34–35 wt. percent monomer in the initial feed) upon the molecular weight distribution of the resultant polymers which was determined by gel permeation chromatography (G.P.C.).

In practicing the present invention, 70 to 100 parts by weight, preferably 95 to 99.5 parts by weight of an isoolefin preferably containing 4 to 8 carbon atoms and preferably having a purity of about 99 wt. percent or more, is polymerized with 30 to 0 parts by weight, preferably 5 to 0.5 parts by weight of a multiolefin preferably containing 4 to 10 carbon atoms and preferably having a purity of 95 wt. percent or more. Suitable examples of the isoolefin include isobutylene, 2-methyl-butene-1, 3-methyl-butene-1, 2-methyl-pentene-1, 3-methyl-butene-2, isoheptylene, isooctylene, etc. and mixtures thereof. Suitable examples of multiolefins include isoprene, butadiene-1,3, dimethylbutadiene-1,3, pentadiene-1,3, heptadiene-1,3, etc. and mixtures thereof. All or part of the aforesaid straight chain multiolefins may be replaced with cyclic multiolefins such as cyclopentadiene, styrene, alpha-methylstyrene, divinyl benzene, etc. and mixtures thereof. The preferred monomer for the homopolymerization reaction is isobtuylene and the preferred monomers for the copolymerization reaction are isobutylene and isoprene (the resultant copolymer is usually referred to as "butyl rubber").

One or more isoolefins alone or in admixture with one or more multiolefins, are preferably mixed with 0.05 to 20 volumes, more preferably 2–7 volumes of a low freezing, noncomplex forming (with the catalyst) inert diluent and the mixture is then admitted into a suitable reactor. The inert diluent may be one which is a nonsolvent for the final polymer such as $C_1$–$C_4$ alkyl halides, e.g. methyl chloride, methylene chloride, ethyl chloride, ethylene chloride, methyl fluoride, ethyl fluoride, ethylene fluoride, difluoroethane, perfluoroethane, etc. and mixtures thereof. Alternatively, the inert diluent may be one which is a solvent for the final polymer such as a $C_4$–$C_{10}$ saturated hydrocarbon, e.g. butane, pentane, hexane, isohexane, cyclohexane, heptane, octane, isooctane, light naphtha fractions, etc. and mixtures thereof. As a further alternate the polymerization reaction may be initially carried out in the presence of one of the nonsolvents and upon completion of the polymerization reaction, the nonsolvent may be replaced with a solvent for the final polymer as set forth in U.S. Patent 2,988,527.

Concurrently or subsequently, a catalyst consisting of a Friedel-Crafts catalyst preferably dissolved in an alkyl halide of the type mentioned above, is added to the mixture of the monomer and inert diluent which has been preferably prechilled to a temperature of between about $+30°$ F. and $-250°$ F., most preferably between $-100°$ F. and $-180°$ F. The concentration of the Friedel-Crafts catalyst in the catalyst solution is generally in the range of 0.02–2.0 wt. percent, preferably 0.05 to 0.5 wt. percent. The preferred catalyst solution consists of aluminum trichloride dissolved in methyl chloride although other Friedel-Crafts compounds or complexes may be employed such as those disclosed by N. O. Calloway in the article entitled, "The Friedel-Crafts Synthesis," printed in Chemical Reviews, vol. 17, No. 3, beginning on page 327.

The reactor may be of any type suitable for carrying out olefin polymerization reactions. Representative types of the latter which may be employed in this process include those shown in U.S. Patents 2,436,767 issued Feb. 24, 1948 to R. L. Gerlicher, 2,507,105, issued May 9, 1959 to F. A. Howard et al., 2,636,026 issued Apr. 21, 1953 to J. F. Nelson, 2,815,334 issued Dec. 3, 1957 to R. F. Killey et al. and 2,999,084 issued Sept. 5, 1961 to H. K. Arnold et al.

The polymerization reaction is carried out batchwise or on a continuous basis at temperatures in the range of about $+30°$ F. to about $-250°$ F. preferably between about $-100°$ F. and about $-180°$ F. These low temperatures may be maintained by either internal or external refrigeration by known methods. The residence time of the monomers in the reactor may vary from about 0.5 minute to 60 minutes, preferably from 8 minutes to 30 minutes. The pressure in the reaction zone may vary from subatmospheric to supra-atmospheric depending upon the reactor conditions and the reactor employed. However, the pressure is not a critical process condition and may be generally as low as 10 p.s.i.a. or as high as 250 p.s.i.a.

If desired, an appropriate amount of a modifier material may be added to the olefinic reactant materials concurrently with or prior to carrying out the polymerization reaction in order to obtain a polymer having any desired weight average molecular weight as disclosed in U.S. Patents 2,479,418 issued Aug. 16, 1959 to Henry G. Schutze and 2,625,538 issued Jan. 13, 1953 to W. J. Sparks et al. which are incorporated herein by reference. These weight average molecular weight modifier materials may be employed in amounts ranging from 0.001 to 15 wt. percent, preferably 0.1 to 10 wt. percent, based on the amount of olefinic reactant materials. Suitable weight average molecular weight modifier materials include normal and branched monoolefins having 4 to 12 carbon atoms such as butene-1, butene-2, trimethylethylene, the dimer of propylene, diisobutylene, triisobutylene, the octenes, isomers of the above such as cis-butene-2, trans-butene-2, etc. and mixtures thereof.

The polymer which is produced in the reactor may be in the form of a slurry (i.e. a dispersion of substantially insoluble polymer particles) or a solution depending on whether the inert diluent chosen for the polymerization reaction is a nonsolvent or solvent for the polymer. After completion of the polymerization reaction, the polymer slurry or solution is then caused to flow into a flash drum wherein it is contacted with (a) steam to remove unreacted volatile reactants and diluents (which may be purified by conventional methods and recycled to the reactor) and with (b) hot water or a suitable solvent to slurry or dissolve the polymer. The polymer is then conventionally recovered by filtration, degassing, extrusion and drying or the like; if desired, the polymer may be blended with hydrocarbon blacks, fillers, extenders, oils, resins, waxes, asphalts and the like during or subsequent to the recovery procedures by methods well known in the prior art such as that disclosed in U.S. Patent 2,988,527. The polymer as recovered has a weight average molecular weight (as measured by light scattering or gel permeation chromatography) in the range of about 400,000 or 2,000,000 or more, preferably between about 700,000 and 1,000,000.

The essence of this invention is based on the discovery that the molecular weight distributions of the polymer produced during the polymerization reaction is intimately related to the following polymerization conditions: (1) the reactor feed rate per pound of catalyst per hour passing through the reaction zone; "reactor feed" as employed herein encompasses the total amount of all olefinic reactant materials, any weight average molecular weight modified materials, and inert polymerization diluents, but does not include any catalyst diluents, (2) the concentration, in weight percent, of the isoolefin in the reactor feed; and (3) the concentration, in weight percent, of unreacted isoolefin in equilibrium in the reactor zone; this latter polymerization condition is easily measured by sampling the flash gas which is produced when the reactor effluent is passed into the flash tank and therein flashed off (e.g. by direct heating, steam, etc.); the concentration of the unreacted isoolefin in the flash gas sample may then be subsequently determined by gas chromatography.

An isoolefin homopolymer or isoolefin-multiolefin copolymer of any desired molecular weight distribution is obtained by carrying out the polymerization reaction in accordance with the following process formula:

$\overline{M}_w/\overline{M}_n$ = Molecular weight distribution = $0.925 + 0.057(A) + 0.263(B) - [(5 \times 10^{-5})(C)]$ wherein $\overline{M}_w$ is the weight average molecular weight of the polymer, $\overline{M}_n$ is the number average molecular weight of the polymer, A is the weight percent concentration of isoolefin in the reactor feed, B is the weight percent concentration of unreacted isoolefin in the flash gas and C is the weight of reactor feed in pounds per pound of catalyst per hour passing through the reaction zone.

Generally the concentration of isoolefin in the reactor feed may vary from about 5 to 95, preferably 15 to 60 wt. percent, and the unreacted isoolefin concentration in the flash gas may vary about 1 to 60, preferably 5 to 25 wt. percent. The reactor feed rate may be in the range of about 200 to 50,000, preferably 1000 to 30,000, pounds per pound of catalyst per hour. However, it should be understood that any one of these factors may vary considerably and hence the values set forth above are merely representative and not critical. Rather it is the interrelationship of these factors which is critical and almost any value for any factor may be employed, providing that the values chosen, when inserted in the above process formula, will result in a polymer having the desired molecular weight distribution.

In order to demonstrate the criticality of the process formula set forth above reference will now be made in detail to the figures.

FIGURE 1 graphically illustrates the effect of unreacted isoolefin concentration in the gas upon the molecular weight distribution of the resultant polymer. In this case, isobutylene (about 97.0 parts by weight) was copolymerized with isoprene (about 3.0 parts by weight) in the presence of a methyl chloride diluent and an aluminum trichloride-methyl chloride catalyst solution in accordance with the general procedures set forth above to produce a copolymer commonly known as butyl rubber, grade 218. This grade of butyl rubber has a Mooney viscosity of 50 to 60 (as measured by the standard Mooney Viscometer at 260° F.), a weight average molecular weight of 700,000 to 1,200,000 and a molar unsaturation level of 1.0 to 2.0%. As is apparent from FIGURE 1, as the concentration of the unreacted isobutylene in the flash gas increased, the molecular weight distribution of the polymer also increased. From the slope of the curve, it is clear that the unreacted isoolefin concentration in the flash gas is a primary factor governing the molecular weight distribution of the resultant polymer.

Figure 2:
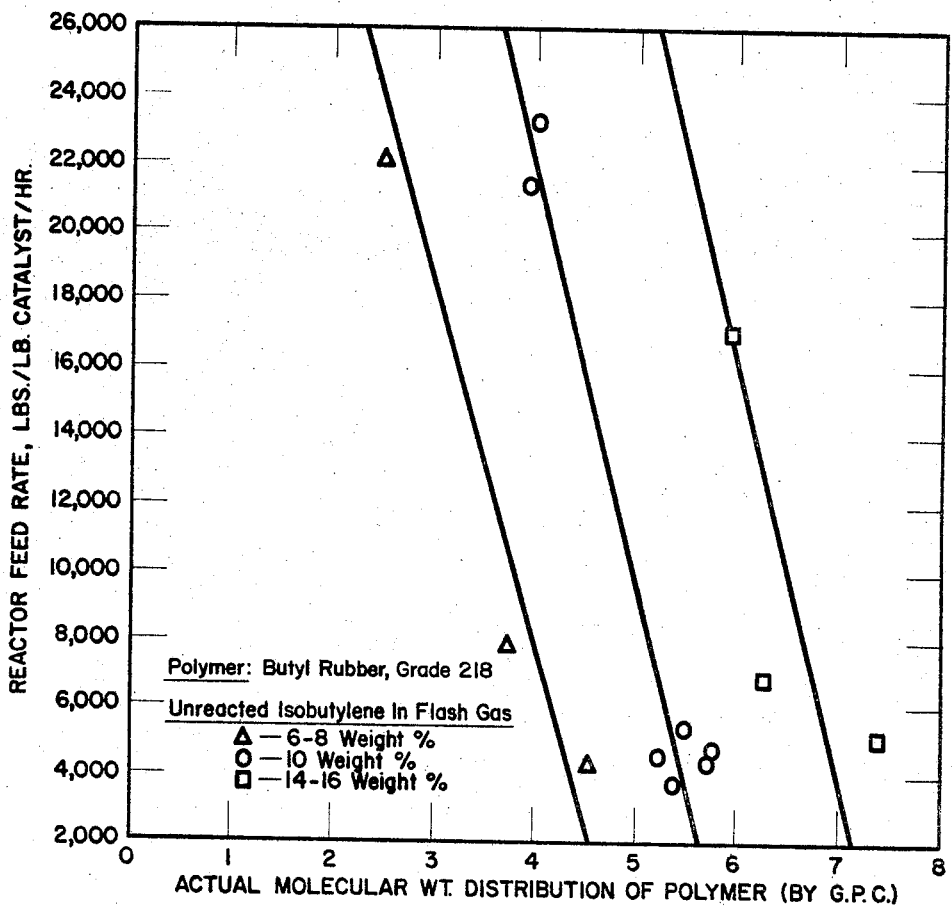
FIGURE 2 is a graphical illustration of the effect of the total feed rate (at varying concentrations of monomer in the initial feed and at varying concentrations of residual unreacted monomer in the reactor effluent) upon the molecular weight distribution of the resultant polymers which was determined by G.P.C.

FIGURE 2 graphically illustrates the effect of the reactor feed rate in lbs. per lb. of catalyst per hour upon the molecular weight distribution of the polymer (which was also butyl rubber, grade 218). Since the slopes of the curves (representing tests carried out at the indicated concentrations of unreacted isobutylene in the flash gas) are substantially identical and since the curves are nearly perpendicular to the abscissa, it is clear that the total feed rate in the reactor zone is an important factor though of secondary significance. Other results obtained also indicate that the concentration of isobutylene in the reactor feed is likewise an important factor, though of secondary significance.

FIGURE 3 graphically illustrates the correlation of the actual molecular weight distribution of the polymer (which was butyl rubber, grade 218) as determined by gel permeation chromatography (G.P.C.) and the predicted molecular weight distribution of the polymer calculated from the process formula set forth above. The critical nature of the process formula is proven by the fact that the curve obtained was a straight line (as proven by regression analysis techniques) which intersected the origin at substantially a 45° angle, illustrating a slope of 1.0 or continuity in data equality and validity.

This invention will be further illustrated by the following specific examples which are given by way of illustration and are not intended as limitations on the scope of this invention.

EXAMPLE 1

A commercial polymerization reactor of the type illustrated in U.S. Patent 2,999,084 was employed for several tests to prepare butyl rubber, grade 218. The polymerization reactions utilized isobutylene, (99.5+ wt. percent purity), isoprene (99.5+ wt. percent purity) and trace amounts of cis- and trans-butene-2, n-butene-1 and n-butane and isobutane, and were conducted in the presence of a catalyst solution consisting of aluminum trichloride dissolved in methyl chloride at a temperature of −170° F. to −150° F. and a pressure of 50 to 100 p.s.i.g. Other polymerization conditions and the types of polymers thus produced are shown in Table I. The polymers were recovered in the form of aqueous slurries from the flash tank and conventionally treated by several extrusion operations to obtain finished butyl rubber bales.

TABLE I

| Test No. | 1 | 2 | 3 | 4 | 5 |
|---|---|---|---|---|---|
| Run Length, hrs. | 1.5 | 2 | 1.5 | 2 | 0.5 |
| Reactor Feed: | | | | | |
| Butanes, lbs./hr. | 71 | 37 | 34 | 102 | 69 |
| Isobutylene, lbs./hr. | 9,044 | 5,453 | 5,358 | 6,455 | 10,144 |
| Isoprene, lbs./hr. | 260 | 167 | 173 | 236 | 313 |
| Butenes, lbs./hr. | 30 | 15 | 3 | 27 | 4 |
| Methyl Chloride, lbs./hr. | 16,323 | 10,257 | 10,434 | 23,119 | 18,490 |
| Isobutylene Concentration in Reactor Feed, wt. percent | 35.15 | 34.23 | 33.49 | 21.56 | 34.98 |
| Catalyst Feed: | | | | | |
| $AlCl_3$, lbs./hr. | 5.0 | 3.6 | 3.5 | 1.4 | 4.3 |
| Methyl Chloride, lbs./hr. | 3,170 | 2,104 | 2,465 | 966 | 3,157 |
| $AlCl_3$ Concentration in Methyl Chloride, wt. percent | 0.156 | 0.169 | 0.140 | 0.145 | 0.133 |
| Flash Gas (Analyzed by gas chromatography): | | | | | |
| Butanes, lbs./hr. | 92 | 49 | 50 | 107 | 65 |
| Isobutylene, lbs./hr. | 3,299 | 1,503 | 1,203 | 3,113 | 1,307 |
| Isoprene, lbs./hr. | 131 | 78 | 64 | 173 | 71 |
| Butenes, lbs./hr. | 28 | 18 | 4 | 22 | 7 |
| Methyl Chloride, lbs./hr. | 19,493 | 12,361 | 12,898 | 24,084 | 21,647 |
| Concentration of Isobutylene in Flash Gas, wt. percent | 14.32 | 10.73 | 8.46 | 11.32 | 5.66 |
| Dewatering Extruder Performance: | | | | | |
| Water Content of Feed, wt. percent | 48.2 | 50.0 | 55.0 | 58.0 | 62.5 |
| Water Content of Extrudate, wt. percent | 5.1 | 4.5 | 8.3 | 6.0 | 5.2 |
| Drying Extruder Performance: | | | | | |
| Physical Appearance of Feed | Very compact | Very compact | Fair | Poor | Poor |
| Water Content | Dry | Dry | Dry | Wet | Wet |
| Physical Appearance of Extrudate | Excellent | Good | Fair | Poor | Poor |
| Power Consumption per 1,000 lb. rubber | Very Low | Low | Moderate | High | Very high |
| Balding Extruder Performance: | | | | | |
| Extrusion Rate, lbs./hr. | 4,800 | 4,400 | 3,600 | 2,900 | 1,910 |
| Appearance of Bale | Excellent | Excellent | Good | Poor | Poor |
| Rubber: | | | | | |
| Production Rate, lbs./hr. | 5,874 | 4,039 | 4,264 | 3,405 | 9,079 |
| Mole Percent Unsaturation | 1.51 | 1.51 | 1.55 | 1.55 | 1.65 |
| Mooney Viscosity (at 260° F.) | 53 | 57 | 55 | 57 | 56 |
| Tensile Strength, p.s.i. | 2,910 | 3,000 | 2,980 | 2,950 | 3,030 |
| Molecular Weight Distribution (by gel permeation chromatography) | 7.3 | 5.6 | 4.5 | 3.9 | 2.9 |

The results in Table I indicate that polymers having widely differing molecular weight distributions may be prepared by varying the polymerization conditions responsive to the process formula set forth above. This is particularly advantageous when it is considered that other properties (e.g. viscosity, mole percent unsaturation and tensile strength) which are utilized in standardizing the "grades" of the polymer are not significantly affected by the variations in the molecular weight distribution. Moreover, the use of the process formula permits the heretofore unachieved production of polymers with a molecular weight distribution of at least 4.5. As may be seen from Table I, these polymers had better physical appearance, were more easily extruded and required less power consumption during the extrusion operations.

EXAMPLE 2

Two samples of butyl rubber grade 218 having different molecular weight distributions were prepared in accordance with the process set forth in Example 1. The samples were then blended with commercial carbon blacks and a paraffinic extender oil (having a Saybolt viscosity at 38° F. of 39.4, an open cup flash point of 370° F. and a pour point of +30° F.) on a Banbury mixer. The results are shown in Table II below.

TABLE II

| Sample | Butyl Rubber A | Butyl Rubber B |
| --- | --- | --- |
| Molecular Wt. Dist. | 5.4 | 3.0 |
| Mooney Vis. at 260° F | 55 | 55 |
| Formula Mix: | | |
| Butyl Rubber | 100 | 100 |
| Fast-Extruding Furnace Carbon Black | 20 | 20 |
| Semi-Reinforcing Carbon Black | 40 | 40 |
| Extender Oil | 20 | 20 |
| Zinc Oxide | 5 | 5 |
| Banbury Cycle, minutes | 13 | 13 |
| Banbury Temperature, ° F | 275 | 275 |
| Dispersion Index by Electron Microscope Photo micrographs | (¹) | (²) |

¹ Individual carbon particles of 200–600 A.
² Agglomerate carbon particles of 800–3,000 A.

No extreme mixing steps or separate treatments were employed during the Banbury mixing; the only difference in each formulation was in the molecular weight distribution of the polymers. The fact that the carbon black in the rubber having the broad molecular weight distribution was in the nature of discrete particles of a very small particle size in contrast to the carbon black agglomerates obtained during Banbury mixing of the narrow molecular weight distribution rubber indicates that higher electrical resistivity and better carbon-rubber bonding was achieved in the former sample than in the latter. Intimate carbon bonding is desirable since the physical and dynamic properties of loaded rubber are directly related to the degree of bonding between the carbon black and the rubber. Example 2 thus points out the advantages of operating a polymerization process so as to obtain polymers of any predetermined molecular weight distribution, particularly those having a molecular weight distribution of at least 4.5.

EXAMPLE 3

Polyisobutylene having a molecular weight distribution of 5.0 is prepared in accordance with the procedures set forth in Example 1 (using the process formula set forth above); the isobutylene feed typically contains about 0.4 wt. percent normal butenes and the reactor is operated so as to obtain at least 8 wt. percent, preferably 12–20 wt. percent, unreacted isobutylene in the flash gas. The resultant polyisobutylene is much easier to finish and has improved odor and color as compared to polyisobutylene having a molecular weight distribution of less than 4.5. It is also noted that blends of the polyisobutylene having a molecular weight distribution of greater than 5.0 with other polyolefins, e.g. polyethylene, polypropylene, etc. can be readily prepared whereas polyisobutylene having a molecular weight distribution of less than 4.5 ordinarily does not homogeneously blend with the polyolefins. This example also points out that the present invention is useful in the preparation of homopolymers as well as copolymers.

The description, drawings and examples contained herein point out the method whereby polymers of any predetermined molecular weight distribution may be obtained. This method is not only novel but highly advantageous since it may be practiced in existing commercial-type polymerization plants with little or no modifications to the plant equipment. In particular, a method is described for the production of polymers having superior physical properties, i.e. those having a molecular weight distribution of at least 4.5.

Resort may be had to various modifications and variations of the disclosed embodiments of the present invention without departing from the spirit of the invention or the scope of the appended claims.

What is claimed is:

1. In a process for preparing solid polymers from 70 to 100 parts by weight of an isoolefin with 30 to 0 parts of a multiolefin in the presence of an inert diluent and a Friedel-Crafts catalyst at a temperature of about +30° F. to −250° F. wherein the reactor effluent is treated to recover the polymer and any unreacted monomers and inert diluent in the form of a flash gas, the improvement which permits carrying out the process so as to obtain a polymer of any desired molecular weight distribution in accordance with the process formula:

$$\overline{M}_w/\overline{M}_n = \text{Molecular weight distribution} = 0.925 \\ + 0.057(A) + 0.263(B) - [(5 \times 10^{-5})(C)]$$

wherein $\overline{M}_w$ is the weight average molecular weight of the polymer, $\overline{M}_n$ is the number average molecular weight of the polymer, A is the weight percent concentration of isoolefin in the reactor feed, B is the weight percent concentration of unreacted isoolefin in the flash gas and C is the weight of reactor feed in pounds per pound of catalyst per hour passing through the reaction zone, which comprises:

(a) selecting a desired molecular weight distribution;
(b) selecting a reactive feed rate between 200 to 50,000 pounds per pound of catalyst per hour;
(c) selecting an isoolefin concentration in the reactor feed between about 5 to about 95 wt. percent;
(d) selecting a catalyst concentration in inert diluent vehicle between about 0.01 and 1.0 wt. percent;
(e) solving the process formula for the required wt. percent of unreacted isoolefin in the flash gas to give the desired molecular weight distribution;
(f) operating a reactor unit to prepare said polymer using the feed rate and isoolefin concentration, selecting, measuring the total flash gas in lbs./hr., and monitoring the isoolefin content of the flash gas in wt. percent;
(g) comparing the calculated value of the unreacted isoolefin content of the flash gas with the measured value;
(h) calculating the change in concentration of inert diluent of the flash gas required to make the measured isoolefin concentration of the flash gas equal the calculated isoolefin content of the flash gas;
(i) converting said change in concentration in diluent to a lbs./hr. change required;
(j) altering the lbs./hr. of diluent introduced with the catalyst by said required lbs./hr. change without altering the actual lbs./hr. of catalyst introduced to the reactor;
(k) monitoring the unreacted isoolefin content of the flash gas and comparing the calculated value with the newly determined actual value; and
(l) repeating steps (h) through (k) until the equilibrium reactor conditions balance the process formula.

2. The process according to claim 1 wherein the isoolefin is isobutylene.

3. The process according to claim 1 wherein 95 to 99.5 parts by weight of a $C_4$ to $C_8$ isoolefin is copolymerized with 5 to 0.5 parts of a $C_4$ to $C_{10}$ multiolefin.

4. The process according to claim 3 wherein the isoolefin is isobutylene and the multiolefin is isoprene.

5. The process according to claim 1 wherein the reactor feed rate is in the range of about 200 to 50,000 lb. per lb. of catalyst per hour, the concentration of isoolefin in the reactor feed is in the range of about 5 to 95 wt. percent and the concentration of unreacted isoolefin in the flash gas is in the range of about 1 to 60 wt. percent.

6. The process according to claim 5 wherein the reactor feed rate is in the range of about 1000 to 30,000 lb. per lb. of catalyst per hour, the concentration of isoolefin in the reactor feed is in the range of about 15 to 60 wt. percent and the concentration of unreacted isoolefin in the flash gas is in the range of about 5 to 25 wt. percent.

7. The process according to claim 6 wherein the concentration of isoolefin in the reactor feed is at least 30 wt. percent and the concentration of unreacted isoolefin in the flash gas is at least 10 wt. percent.

8. The process according to claim 7 wherein the concentration of isoolefin in the reactor feed is in the range of 33 to 36 wt. percent and the concentration of unreacted isoolefin in the flash gas is in the range of 13 to 16 wt. percent.

References Cited

UNITED STATES PATENTS 2,999,083  9/1961  Killey et al. ......... 260—85.3
3,033,836  5/1962  Tegge et al. ......... 260—85.3

JOSEPH L. SCHOFER, *Primary Examiner.*

R. A. GAITHER, *Assistant Examiner.*

U.S. Cl. X.R.

260—82.1, 83.7